(12) United States Patent
Shin et al.

(10) Patent No.: US 9,840,800 B2
(45) Date of Patent: Dec. 12, 2017

(54) LAUNDRY TREATING APPARATUS

(71) Applicant: LG Electronics Inc., Seoul (KR)

(72) Inventors: Hyosang Shin, Changwon-si (KR); Hyunsang Kim, Changwon-si (KR); Minkyu Park, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/019,232

(22) Filed: Sep. 5, 2013

(65) Prior Publication Data

US 2014/0068872 A1   Mar. 13, 2014

(30) Foreign Application Priority Data

Sep. 13, 2012 (KR) .......................... 10-2012-0101447

(51) Int. Cl.
| | |
|---|---|
| *D06F 33/02* | (2006.01) |
| *G06F 1/24* | (2006.01) |
| *D06F 58/28* | (2006.01) |
| *D06F 39/00* | (2006.01) |
| *G06F 11/14* | (2006.01) |
| *D06F 58/08* | (2006.01) |

(52) U.S. Cl.
CPC ............ *D06F 33/02* (2013.01); *D06F 39/005* (2013.01); *D06F 58/28* (2013.01); *G06F 1/24* (2013.01); *G06F 11/1417* (2013.01); *D06F 58/08* (2013.01); *D06F 2058/2877* (2013.01); *D06F 2058/2883* (2013.01); *D06F 2210/00* (2013.01); *D06F 2212/00* (2013.01); *D06F 2216/00* (2013.01)

(58) Field of Classification Search
None
See application file for complete search history.

(56) References Cited

U.S. PATENT DOCUMENTS

| | | | | |
|---|---|---|---|---|
| 5,887,456 | A * | 3/1999 | Tanigawa et al. | 68/20 |
| 7,380,423 | B1 * | 6/2008 | Musone | 68/20 |

(Continued)

FOREIGN PATENT DOCUMENTS

| | | |
|---|---|---|
| CN | 1341785 A | 3/2002 |
| CN | 1373249 A | 10/2002 |

(Continued)

*Primary Examiner* — Michael Barr
*Assistant Examiner* — Cristi Tate-Sims
(74) *Attorney, Agent, or Firm* — Dentons US LLP

(57) ABSTRACT

A laundry treating apparatus including a drum holding a washing object, a drive unit rotating the drum, a drive controller, a display unit with an input unit accepting drive unit control orders, and a display communicating treating progress of the washing object. The display unit having a controller with an input data processing unit, an output data processing unit, and a processing unit control program for running the input and output data processing units. The laundry treating apparatus further including a system managing unit enabling the drive controller and display unit to exchange data with the display unit controller, ordering operation of the display unit, and running the processing unit control program, a list storage unit storing a program list the display unit controller runs, and a monitoring unit for initializing the system managing unit if the processing unit control program is not at the list storage unit.

8 Claims, 3 Drawing Sheets

(56) References Cited

U.S. PATENT DOCUMENTS

| | | |
|---|---|---|
| 2002/0116959 A1 | 8/2002 | Ohta et al. |
| 2003/0037383 A1* | 2/2003 | Broker ............... A47L 15/42 |
| | | 8/159 |
| 2003/0056300 A1* | 3/2003 | Ruhl et al. ................. 8/158 |
| 2005/0262882 A1* | 12/2005 | Moon ............... D06F 39/005 |
| | | 68/12.01 |
| 2006/0021154 A1* | 2/2006 | Ha ................... D06F 39/005 |
| | | 8/158 |
| 2007/0107754 A1* | 5/2007 | Jeong ............... A47L 15/4293 |
| | | 134/58 D |
| 2007/0135948 A1* | 6/2007 | Maase ........................ 700/86 |
| 2009/0120136 A1* | 5/2009 | Schroeder et al. ......... 68/12.27 |
| 2010/0259403 A1* | 10/2010 | Cho ................... D06F 39/005 |
| | | 340/679 |
| 2013/0009573 A1* | 1/2013 | Chang et al. ............. 318/400.1 |

FOREIGN PATENT DOCUMENTS

| | | | |
|---|---|---|---|
| CN | 1396330 A | 2/2003 | |
| CN | 101397738 A | 4/2009 | |
| EP | 1186693 A2 | 3/2002 | |
| GB | 2454580 A | 5/2009 | |
| IN | WO2009084025 A2 * | 7/2009 | ............ D06F 33/02 |
| JP | 2001-195020 A | 7/2001 | |
| JP | 2002-11280 A | 1/2002 | |
| JP | 2002-186797 A | 7/2002 | |
| KR | 10-2002-0012736 A | 2/2002 | |

\* cited by examiner

【Fig. 1】
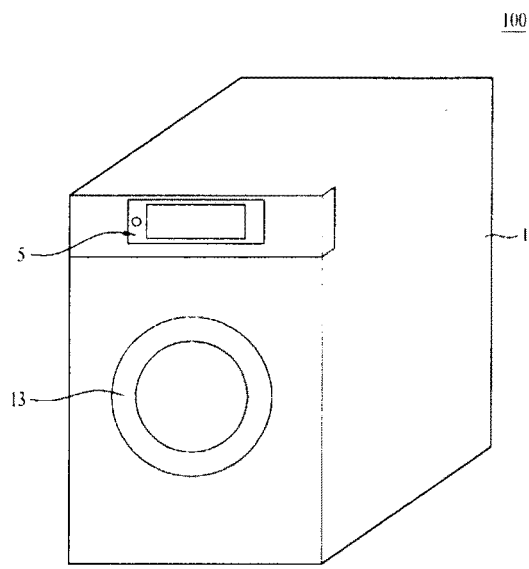
【Fig. 2】
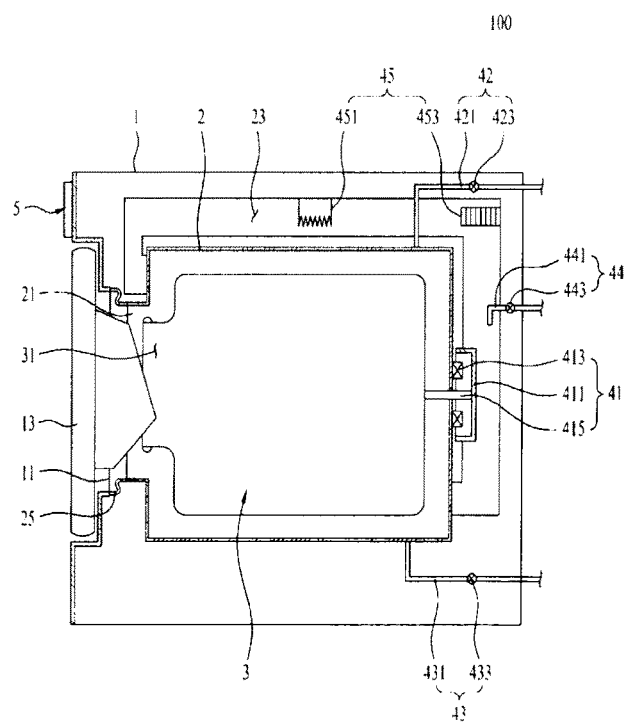

[Fig. 4]
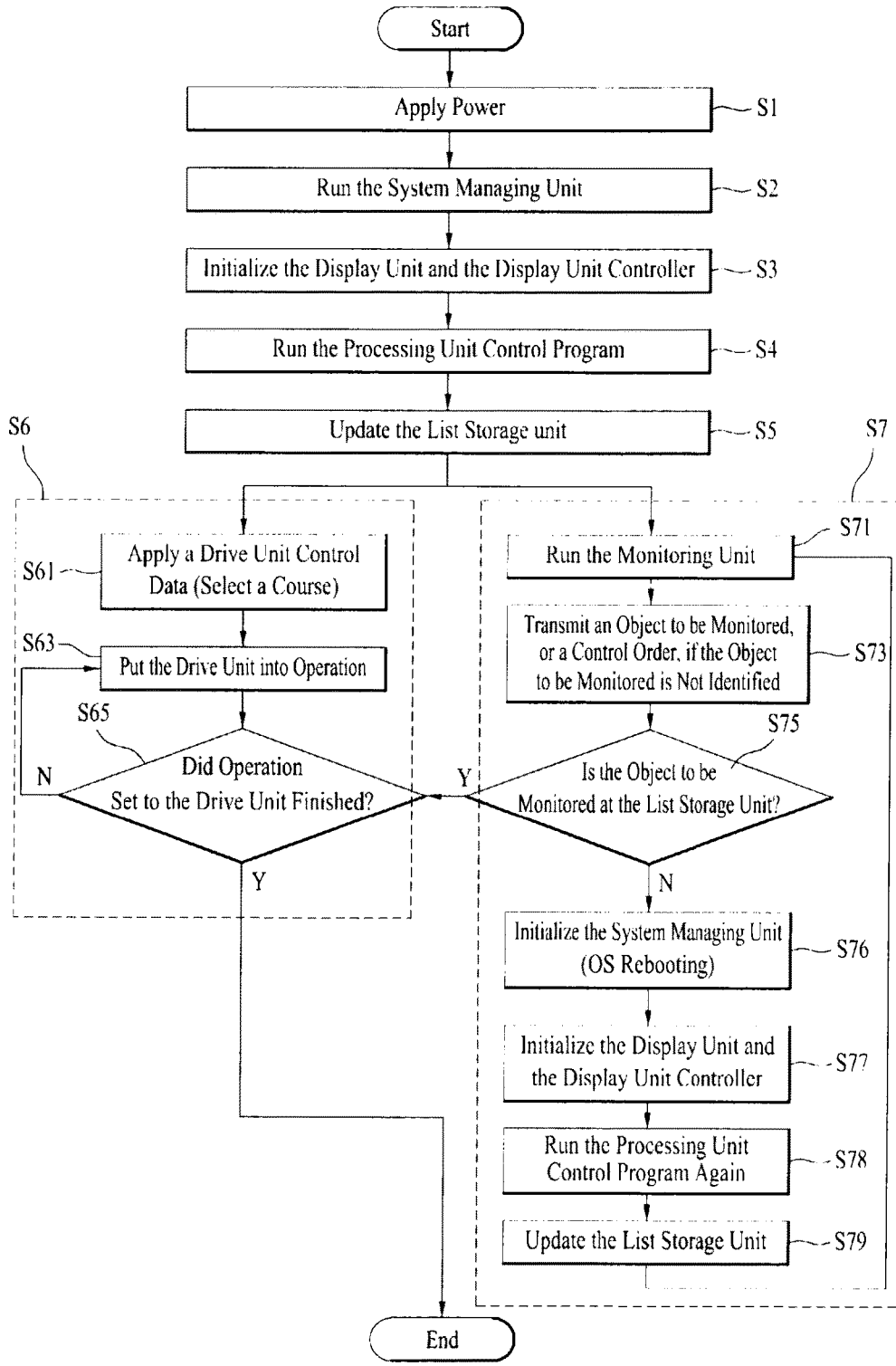

LAUNDRY TREATING APPARATUS

CROSS REFERENCE TO RELATED APPLICATION

This application claims the benefit of the Patent Korean Application No. 10-2012-0101447, filed on Sep. 13, 2012, which is hereby incorporated by reference as if fully set forth herein.

BACKGROUND OF THE DISCLOSURE

Field of the Disclosure

The present invention relates to a laundry treating apparatus.

Discussion of the Related Art

In general, the laundry treating apparatus is a machine for removing various kinds of dirt from clothes and beddings (Washing object) by using a softening action of detergent, friction force and impact of water circulation caused by rotation of a pulsator (Or, a drum).

Moreover, the laundry treating apparatus is a concept including a domestic appliance which can, not only wash the washing object, but also dry the washing object, and wash and dry the washing object.

In the meantime, a related art laundry treating apparatus has a control panel provided to a cabinet which forms an exterior appearance of the laundry treating apparatus for applying a control order, such as a washing course, to the laundry treating apparatus.

The control panel is provided with an input unit having a button (A physical form of button) for ordering power supply, course selection, and running/stopping of the course selected thus, and a display for displaying the control order applied through the input unit, or a washing progress of the washing object.

SUMMARY OF THE DISCLOSURE

To solve the problems, an object of the present invention is to provide a laundry treating apparatus having a display unit in which application of a control order and display of a treating progress of a washing object can be embodied with one unit.

Another object of the present invention is to provide a laundry treating apparatus in which, when an error takes place, operation of a driving unit is not interrupted, but only a display unit is initialized.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a laundry treating apparatus includes a drum for holding a washing object, a drive unit having a motor for rotating the drum, a drive controller for controlling the drive unit, a display unit having an input unit for user's application of a drive unit control order thereto, and a display for displaying a treating progress of the washing object, a display unit controller having an input data processing unit for receiving a control order from the input unit and providing the same to the drive controller, an output data processing unit for receiving the drive data from the drive controller and providing the same to the display, and a processing unit control program for running the input data processing unit and the output data processing unit, a system managing unit for enabling the drive controller and the display unit to make data exchange with the display unit controller, and ordering operation of the display unit and running of the processing unit control program, a list storage unit having a program list the display unit controller runs stored therein, and a monitoring unit for initializing the system managing unit if the processing unit control program is not at the list storage unit.

The laundry treating apparatus of the present invention may be provided such that only the display unit and the display unit controller are initialized when the initialization of the system managing unit is in progress.

And, the initialization of the system managing unit may be a rebooting for making the display unit and the display unit controller to be put into operation again after the operation is stopped as the system managing unit is put into operation again after the operation is stopped.

And, the display may be an LCD panel or LED panel controlled by the output data processing unit, and the input unit may be a touch panel positioned on the display for providing a control signal to the input data processing unit when a user's body touches the touch panel.

And, the drive unit may further include an air supply unit for supplying air to an inside of the drum.

And, the laundry treating apparatus of the present invention may further include a tub having the drum housed therein for holding washing water, and the drive unit may further include a water supply unit for supplying the washing water to the tub and a drain unit for draining the washing water from an inside of the tub.

And, the drive unit may further include an air supply unit for supplying the air to an inside of the tub.

In this case, the tub may further include a duct for discharging the air from the inside of the tub to an outside of the tub and re-supplying the air to the tub, and the air supply unit may be provided to the duct for dehumidifying and heating the air discharged from the duct thus.

And, the air supply unit may include a heater provided in the duct for heating the air in the duct, a fan provided in the duct for making the air in the tub to move, and a cooling water supply unit for condensing the air discharged from the tub.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIGS. 1 and 2 illustrate a laundry treating apparatus in accordance with a preferred embodiment of the present invention.

FIG. 4 illustrates a flow chart showing the steps of a method for controlling a laundry treating apparatus in accordance with a preferred embodiment of the present invention.

DESCRIPTION OF SPECIFIC EMBODIMENTS

Figure 3:
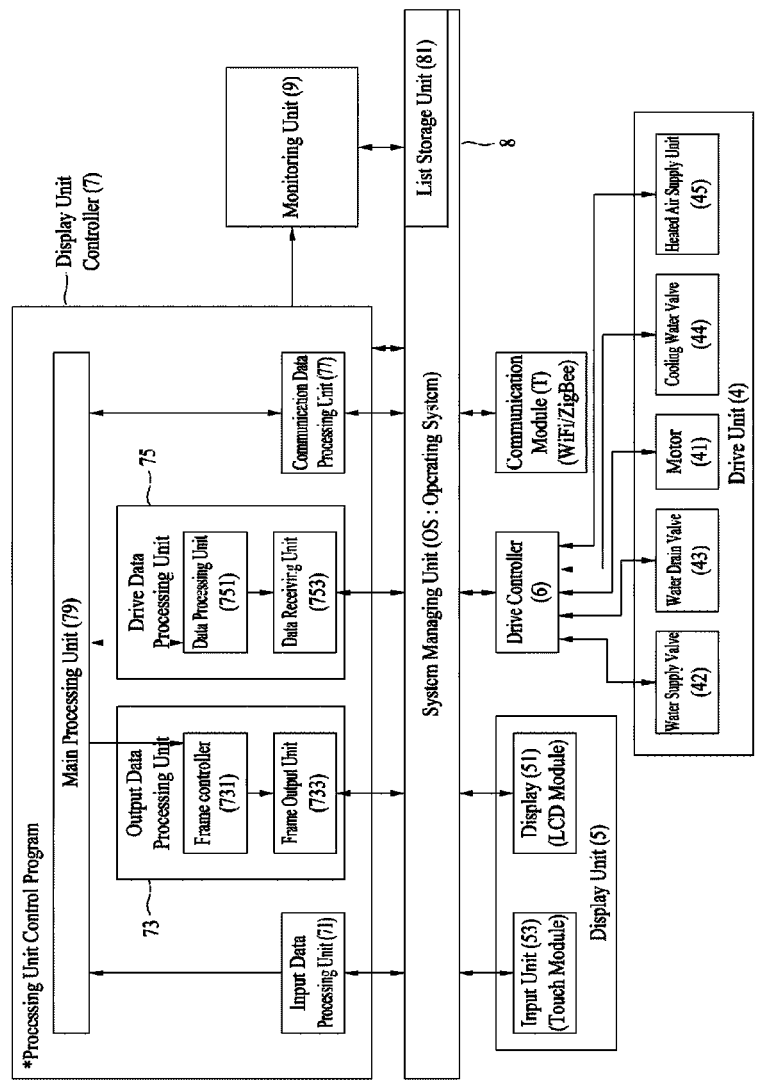
FIG. 3 illustrates a block diagram showing a display unit, a display unit controller, a system managing unit, and a monitoring unit provided to a laundry treating apparatus in accordance with a preferred embodiment of the present invention.

Reference will now be made in detail to the specific embodiments of the present invention, examples of which are illustrated in the accompanying drawings. A configuration or a control method of a device described hereinafter is provided only for describing embodiments of the present invention, but not for limiting scopes of patent rights of the present invention. Wherever possible, the same reference numbers will be used throughout the drawings to refer to the same or like parts.

Referring to FIGS. 1 and 2, the laundry treating apparatus 100 of the present invention includes a cabinet 1 which forms an exterior appearance of the laundry treating apparatus, a tub 2 provided in the cabinet for holding washing water, a drum 3 rotatably provided in the tub for holding a washing object, a drive unit provided for washing the washing object, a display unit 5 for application of a control order, such as a washing course, and displaying a treating progress of the washing object.

The cabinet 1 has an introduction opening 11 for introduction or taking out the washing object to/from the drum 3, and the introduction opening 11 is opened/closed with a door 13 rotatably coupled to the cabinet 1.

The tub 2 has a space for holding washing water required for washing, and has a tub opening 21 at a position matched to the introduction opening 11.

The tub opening 21 is connected to the introduction opening 11 with a gasket 25, not only for preventing the washing water from leaking to an outside of the tub, but also preventing vibration liable to take place when the drum 3 rotates from transmitting to the cabinet 1 through the tub 2.

The drum 3 includes a drum opening 31 provided to a position matched to the tub opening 21. Therefore, the user may open the door 13 to introduce the washing object to the drum 3 through the introduction opening g 11 and the tub opening 21, or take out the washing object from the drum 3.

The drum 3 has a plurality of pass through holes (Not shown) provided therein. Trough the pass through holes, the washing water is introduced to the drum from the tub, and the washing water in the drum and the washing water contained in the washing object can be discharged to the tub.

The display unit 5 includes an input unit 53 (See FIG. 3) for user's application of a control order (An order for selecting a washing course, a drying course, or the like) required for controlling the laundry treating apparatus 100 thereto, and a display 51 (See FIG. 3) for displaying a control order (A name of a selected course, a water level or a time period set to the course) applied thereto through the input unit, or a treating progress (A progress of the selected course, i.e., a time period until finish of the course) of the washing object.

Different from the related art laundry treating apparatus, the display unit 5 may be provided in a mode of a touch screen for enabling to display application of the control order and the treating progress of the washing object at one unit.

That is, the display unit 5 may include a display provided as a panel (LCD panel, LED panel, or the like) for displaying the treating progress of the washing object, and a touch panel positioned on the display for generating a control signal when a user's body touches the touch panel.

In the meantime, the display unit 5 is controlled by a display unit controller 7, which will be described in detail, later.

If a purpose of the laundry treating apparatus 100 is only washing, the drive unit may include a motor 41 for rotating the drum 3, a water supply unit 42 for supplying the washing water to the tub, and a drain unit 43 for draining the washing water from the tub to an outside of the tub.

The motor 41 may include a stator 413 fixedly secured to an outside circumferential surface of the tub 2, a rotor 411 rotatable by an electromagnetic action with the stator, and a rotation shaft 415 connected between the rotor 411 and the drum 3 passed through the tub 2.

The water supply unit 42 may include a water supply pipe 421 connected between the tub 2 and a water supply source (Not shown) positioned on an outside of the laundry treating apparatus, and a water supply valve 423 for opening/closing the water supply pipe 421. The drain unit 43 may include a drain pipe 431 connected to an underside of the tub 2, and a drain valve 433 for opening/closing the drain pipe 431.

The motor 41, the water supply valve 423 and the drain valve 433 are controlled by a drive controller 6.

That is, the user applies a control order, such as the washing course, through the display unit 5, and the drive controller 6 controls the drive unit according to a process set to the control order the user applied thereto for washing the washing object.

In the meantime, if the laundry treating apparatus of the present invention is provided as an apparatus only on a purpose of drying, the tub 2 for holding the washing water, and the water supply unit 42 for supplying the washing water may be omitted.

That is, the laundry treating apparatus 100 only on the purpose of drying may include a cabinet 1, a drum 3 rotatably provided in the cabinet, a motor 41 for rotating the drum, a drive controller 6 for controlling the motor, a display unit 5 for application of a control order, such as a drying course, thereto, and displaying a treating progress of the washing object, and an air supply unit 45 for supplying heated, or unheated air to the drum.

In the meantime, if the laundry treating apparatus of the present invention is provided as an apparatus which is able to wash and dry, the drive unit may further include an air supply unit 45 for supplying heated or unheated air to the tub 2.

In this case, the tub 2 may further include a duct 23 for discharging the air from the tub to an outside of the tub, and supply the air to the tub, again.

If the air supply unit 45 is provided to supply the heated air to the tub, the air supply unit 45 may be provided as a heat pump (Not shown) in the duct 23 which can dehumidify or heat the air.

However, the air supply unit 45 may include a heater 451 for heating the air in the duct 23, and a fan 453 for making the air in the tub 2 to move along the duct 23.

In this case, the drive unit is required to include a cooling water supply unit 44 additionally for condensing the air discharged from the tub 2, wherein the cooling water supply unit 44 may include a cooling water supply pipe 441 for supplying the cooling water to the duct 23, and a cooling water valve 443 for opening/closing the cooling water supply pipe 441.

In the laundry treating apparatus 100 which is able to wash and dry, the drive unit may include a motor 41, a water supply unit 42, a drain unit 43, a cooling water supply unit 44, and an air supply unit 45, and the drive unit will be controlled by the drive controller 6.

That is, if the user applies the control order, such as a washing or drying course, through the input unit 53 of the display unit 5, the drive controller 6 makes a work the user selected to progress by controlling rotation of the drum, supplying/draining of the washing water, and supply of the heated air according to a drive unit control order included to a course the user selected.

In the meantime, though the laundry treating apparatus described before has a structure in which the air in the tub is circulated through the duct 23 to dry the washing object, the laundry treating apparatus may not be provided to have such a structure.

That is, the duct 23 may be provided separated to have a discharge duct (Not shown) for discharging the air from the tub 2 to an outside of the cabinet 1, and a supply duct (Not shown) for supplying the air from the outside of the tub 2 to an inside of the tub 2.

In this case, though the air supply unit is provided to the supply duct, the cooling water supply unit may be omitted.

In the meantime, if the application of the control order and the display of control contents (the treating progress of the washing object) can be made available with one display unit 5, such as a touch screen, the display unit controller 7 is required for controlling the display unit 5.

The display unit controller 7 is means for driving a program to control the display unit 5.

However, the display unit controller 7 is liable to fail to control the display unit 5 appropriately due to an error in the program the display unit controller 7 drives, conflicts among programs the display unit controller 7 controls, and the other causes difficult to identify.

If the display unit controller 7 fails to perform a proper function, the user is, not only difficult to apply the control order through the display unit 5, but also unable to receive information on the treating progress of the washing object during operation of the laundry treating apparatus.

In this case, for putting the display unit 5 back to normal operation, the user is required to interrupt power supply to the laundry treating apparatus 100 and supply power to the laundry treating apparatus again, which has a problem in that the washing or drying process being performed with the drive controller 6 and the drive unit is required to be progressed newly, again.

Accordingly, the present invention intends to provide a laundry treating apparatus 100 in which only the display unit 5 and the display unit controller 7 are rebooted without interruption of operation of the drive unit and the drive controller 6 if the function of the display unit controller 7 fails.

Referring to FIG. 3, the display unit controller 7 provided to the present invention may include an input data processing unit 71 for receiving a data (The control order) from the input unit 53, an output data processing unit 73 for receiving a drive data from the drive controller 6, and main processing unit 79 for receiving the control order from the input data processing unit 71 and providing the same to the drive controller 6, and providing the drive data from the drive controller 6 to the output data processing unit 73.

The input data processing unit 71 provides the control order the input unit 53 provides thereto through the main processing unit 79 to the drive controller 6, and the output data processing unit 73 receives the drive data the drive controller 6 provides thereto through the main processing unit 79.

In the meantime, the display unit controller 7 may further include a drive data processing unit 75 for making data exchange between the drive controller 6 and the main processing unit, easy.

The drive data processing unit 75 may include a data receiving unit 753 for receiving the drive data the drive controller 6 transmits, and a data processing unit 751 for transmitting the drive data received by the data receiving unit 753 to the main processing unit 79.

In this case, the data processing unit 751 serves to select the drive data the drive data the data receiving unit 753 provides thereto to be provided to the user through the display 51, and processing (Operation, transformation) the drive data selected thus to a form the output data processing unit can recognize.

The output data processing unit 73 includes a frame controller 731 for generating a data for controlling the display 51, and a frame output unit 733 for operating the display 51 based on the data the frame controller transmits thereto.

The display unit controller 7 having a configuration described above has a processing unit control program provided thereto for controlling operation of the input data processing unit 71, operation of the output data processing unit 73, operation of the drive data processing unit 75, and an order of operation of each of the processing units 71, 73, and 75.

In the meantime, the laundry treating apparatus 100 of the present invention may further include a system managing unit 8 for controlling an external device provided for data exchange with the laundry treating apparatus, and the display unit controller 7.

That is, the system managing unit 8 may be defined as an OS (Operating system) for enabling the drive controller 6 and the display unit 5 to make data exchange with the display unit controller 7, and managing the control of the display unit 5 and running of the processing unit control program.

In this case, the system managing unit 8 has a list storage unit 81 provided thereto for storing a list of the programs (The processing unit control program and so on) the display unit controller 7 runs.

The list storage unit 81 is updated at fixed intervals with data (A Program list, a list having program titles and the like cited thereon) which enables the user to identify the programs the display unit controller 7 runs.

Accordingly, if the display unit controller 7 runs the processing unit control program and the other programs, the list storage unit 81 stores the list of the programs the display unit controller 7 is running.

The system managing unit 8 may be provided to a physical data storage means, such as a memory. In this case, the list storage unit 81 may be provided to the memory in a mode of programs controlled by the system managing unit 8.

In the meantime, the laundry treating apparatus 100 of the present invention further includes a monitoring unit 9 for monitoring whether the list storage unit 81 has the processing unit control program or not, and initializing the system managing unit 8, if the list storage unit 81 has no processing unit control program.

The monitoring unit 9 receives a program to be monitored, and, in a case the list storage unit 81 has no program to be monitored, a method for dealing with the case, from the processing unit control program.

That is, if power is supplied to the laundry treating apparatus, the system managing unit 8 is booted. Once the system managing unit 8 is booted, the display unit 5 and the other external devices are booted, and the display unit controller 7 runs the processing unit control program.

The boot has a meaning different from simple interruption of power supply to the laundry treating apparatus and re-supply of the power to the laundry treating apparatus.

That is, the boot means that, once power is supplied to the laundry treating apparatus, the display unit and the display unit controller are initialized to a state in which the external devices and the display unit 5 can exchange data with the display unit controller 7 and the user can use the display unit 5 or the other external devices.

In the meantime, the processing unit control program forwards the program titles to be monitored, and, if the list storage unit 81 has no program to be monitored (The processing unit control program), a control order to initialize (reboot) the system managing unit 8, to the monitoring unit 9.

Rebooting of the system managing unit means rebooting of the external devices except the drive unit 4 and the drive control unit 6. This means that, after closing the processing unit control program by closing the system managing unit 8, the system managing unit is put into operation again, to initialize the display unit 5 and to put the processing unit control program into operation again (To put the display unit controller into operation again).

Eventually, the laundry treating apparatus 100 of the present invention has an advantage of putting only the display unit 5 and the display unit controller 7 into operation again without stopping operation of the drive unit 4 even if an error takes place at the display unit controller 7 such that the display unit 5 fails to display information on the treating progress of the washing object the drive controller 6 provides thereto.

Moreover, the laundry treating apparatus 100 of the present invention may further include a communication module T for transmitting a new program to the display unit controller 7 or a new drive program (A program for controlling the drive unit) to the drive controller 6.

In this case, it is preferable that the display unit controller 7 further include a communication data processing unit 77 for making wire/wireless communication with the communication module T.

The data from the communication data processing unit 77 may be stored at the display unit controller 7 by the main processing unit 79, and may be transmitted to the drive controller 6 through the main processing unit 79 and the drive data processing unit 75.

A process for controlling the laundry treating apparatus of the present invention will be described with reference to FIG. 4.

Upon application of power to the laundry treating apparatus 100 (S1), the system managing unit 8 which is the operating system OS of the display unit 5 is come into operation.

When the system managing unit 8 is come into operation (Booted) (S2), the display unit 5 and the other external devices are booted (S3), and the display unit controller 7 runs the processing unit control program (S4), making a state in which the user is able to use the display unit 5.

When the processing unit control program runs, the system managing unit 8 transmits a title of the processing unit control program to the list storage unit 81 to store the title of the processing unit control program in the list storage unit 81 (S5).

Hereafter, the control method of the present invention has a drive unit control step (S6) and a monitoring unit control step (S7) in progress in parallel.

That is, the drive unit control step (S6) includes a step (S61) for applying a course selection order (A drive unit control data) through the input unit 53, and a step (S63) for putting the drive unit into operation based on the drive unit control data applied thus.

And, the drive unit control step (S6) also includes a step (S65) of determining whether the operation of the drive unit is finished or not periodically in the step (S63) of operating the drive unit, and, if the operation of the drive unit is finished based on the drive unit control data, the operation of the drive unit is stopped.

In the meantime, in the monitoring unit control step (S7), the monitoring unit 9 is operated by the processing unit control program (S71), and the monitoring unit 9 receives an object (The processing unit control program) to be monitored and, if there is no object to be monitored at the list storage unit 81, a control order, from the system managing unit 8 (S73).

Thereafter, the monitoring unit 9 determines whether the object to be monitored is at the list storage unit 81 or not periodically (S75), wherein whether the object to be monitored being at the list storage unit 81 or not may be progressed as the monitoring unit 9 requests the same to the system managing unit 8 periodically and the system managing unit 8 searches the list storage unit 81 for the same and transmits a result of the search to the monitoring unit 9.

However, whether the object to be monitored being at the list storage unit 81 or not may be progressed as the monitoring unit 9 searches the list storage unit 81, directly.

If the title of the processing unit control program which is the object to be monitored is at the list storage unit 81, the monitoring unit control step (S7) is finished together with the drive unit control step (S6).

However, if the title of the processing unit control program which is the object to be monitored is not at the list storage unit 81, the monitoring unit 9 initializes the system managing unit 8 (S76).

Since the initializing order to the system managing unit 8 is an order to put the system managing unit 8 into operation again after forcible stopping of operation of the system managing unit 8, initializing of the display unit 5 and the other peripheral devices and initializing of the display unit controller 7 is progressed.

That is, once the system managing unit 8 is initialized, the display unit and the display unit controller are also initialized (S76), and the processing unit control program is run again by the display unit controller (S78).

Once the display unit controller 7 runs again, a data which enables to determine whether the processing unit control program runs or not is stored in the list storage unit 81, and then, a step for running the monitoring unit 9 succeeds.

As has been described, the laundry treating apparatus of the present invention has the following advantages.

The present invention can devise an effect of providing a laundry treating apparatus having a display unit that enables to embody application of a control order and display of control contents with one unit.

And, the present invention can devise an effect of providing a laundry treating apparatus in which only a display unit is initialized without interruption of operation of a drive unit when an error takes place at the display unit.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A laundry treating apparatus comprising:
   a drum to hold a washing object;
   a drive unit including a motor to rotate the drum;
   a drive controller to control the drive unit;
   a display unit including an input unit to receive a drive unit control order and a display to communicate a treating progress of the washing object;
   a display unit controller including:
      an input data processing unit to receive the control order from the input unit and to provide the control order to the drive controller,
      an output data processing unit to receive drive data from the drive controller and to provide the drive data to the display, and
      a processing unit control program to run the input data processing unit and the output data processing unit;
   a system managing unit to enable the drive controller and the display unit to exchange data with the display unit controller, and to order operation of the display unit and running of the processing unit control program;
   a list storage unit including a program list of programs the display unit controller runs; and
   a monitoring unit configured to detect whether the list storage unit includes the processing unit control program and configured to initialize the system managing unit when the list storage unit does not include the processing unit control program,
   wherein the display unit and the display unit controller are initialized when the initialization of the system managing unit is in progress,
   wherein the system managing unit is put into operation again after its operation is stopped, thereby the initialization of the system managing unit reboots the display unit and the display unit controller after their operation are stopped, and
   wherein even if a malfunction occurs at the display unit controller, the drive unit and the drive controller continue to operate.

2. The laundry treating apparatus of claim 1, wherein the drive unit and the drive controller operate to perform a washing or drying process having been performed continually when the initialization of the system managing unit is in progress.

3. The laundry treating apparatus of claim 1, wherein the display is an LCD panel or LED panel controlled by the output data processing unit, and
   the input unit is a touch panel integrated in the display to provide a control signal to the input data processing unit in response to a signal from the touch panel.

4. The laundry treating apparatus of claim 1, wherein the drive unit further includes:
   an air supply unit to supply air to an inside of the drum.

5. The laundry treating apparatus of claim 1, further comprising:
   a tub having the drum housed therein to hold washing water, and
   the drive unit further includes
   a water supply unit to supply the washing water to the tub, and
   a drain unit to remove the washing water from the inside of the tub.

6. The laundry treating apparatus of claim 5, wherein the drive unit further includes:
   an air supply unit to supply the air to the inside of the tub.

7. The laundry treating apparatus of claim 6, wherein the tub further includes:
   a duct to discharge the air from the inside of the tub to an outside of the tub and to re-supply the air to the tub, and
   the air supply unit is provided to the duct to dehumidify and heat the air discharged from the duct.

8. The laundry treating apparatus of claim 7, wherein the air supply unit includes:
   a heater provided in the duct to heat the air in the duct,
   a fan provided in the duct to move the air in the tub, and
   a cooling water supply unit to condense the air discharged from the tub.

* * * * *